United States Patent [19]

Smock

[11] Patent Number: 4,977,999

[45] Date of Patent: Dec. 18, 1990

[54] CONTAINER HANDLER FOR CONVEYOR SYSTEM

[75] Inventor: William L. Smock, Indianapolis, Ind.

[73] Assignee: Smock Material Handling Company, Inc., Indianapolis, Ind.

[21] Appl. No.: 369,048

[22] Filed: Jun. 19, 1989

[51] Int. Cl.$^5$ ............................................. B65G 47/34
[52] U.S. Cl. .................. 198/463.3; 198/592; 198/861.5; 193/35 SS; B65G/47/34
[58] Field of Search .................. 193/55 SS; 198/535, 198/536, 463.3, 586, 592, 861.2, 861.3, 861.5

[56] References Cited

U.S. PATENT DOCUMENTS

| 1,912,898 | 6/1933 | Jennings et al. | 198/463.3 X |
| 2,993,582 | 7/1961 | Souser | 198/463.3 |
| 4,284,187 | 8/1981 | Kramer et al. | 198/592 X |

FOREIGN PATENT DOCUMENTS

| 2805572 | 8/1979 | Fed. Rep. of Germany | 198/592 |
| 2591205 | 6/1987 | France | 198/861.5 |
| 0149210 | 8/1984 | Japan | 193/35 SS |
| 1207949 | 10/1970 | United Kingdom | 198/592 |

Primary Examiner—Joseph J. Rolla
Assistant Examiner—James R. Bidwell
Attorney, Agent, or Firm—Flynn, Thiel, Boutell & Tanis

[57] ABSTRACT

A container handler for use with an over-and-under conveyor having upper and lower gravity-type roller conveyor sections disposed vertically one above the other. The container handler is disposed directly adjacent the discharged end of the upper conveyor and has a support platform alignable with the upper conveyor so that a container can be discharged from the upper conveyor onto the support platform for engagment with a stop. The front end of support platform, namely the end with the container stop, can be vertically lowered by an operator to facilitate access to the container. The front end can be vertically raised and lowered by a first lifting device and, when the operator is completed with his operations, the first lifting device lowers the front end of the support platform to a lowermost position. A second lifting device is then activated to lower the rear end of the support platform downwardly until it aligns with the adjacent inlet end of the lower conveyor to permit discharge of the container thereto. After discharge of the container, both lifting devices are activated to raise the support platform into its fully raised position in alignment with the upper conveyor.

10 Claims, 3 Drawing Sheets

CONTAINER HANDLER FOR CONVEYOR SYSTEM

FIELD OF THE INVENTION

This invention relates to a container handler for a conveyor system and, more particularly, to a multi-motion conveyor handler particularly for use in an over-and-under conveyor system.

BACKGROUND OF THE INVENTION

Manufacturing plants utilize numerous conveyor systems for transporting materials and supplies, and partially or finished product, to various working or assembly stations. At present, conveyor systems known as over-and-under types are commonly used for feeding supplies to a working station. In one such known arrangement, supplies either in cartons or on pallets are fed in a conventional manner along an upper gravity-type roller conveyor onto a carton or pallet handler which defines the lower endmost section of the conveyor. This container handler includes a section of rollers for supporting the container and, at its lower inclined end, a stop flange for abutment with the container. When in this position, the operator is then able to unload the goods contained in the container or stored on the pallet. However, during this unloading operation, particularly after the container has been partially unloaded, the operator must bend considerably in order to reach the goods stored in the bottom of the container, and hence this type of operation has been observed to cause an increasing amount of back problems for the operator. After the container has been totally unloaded (or conversely totally loaded), then the handler is tilted downwardly to be aligned with a lower conveyor section disposed below the upper section, which lower section then feeds the container away from the operator station, following which the handler is returned upwardly for alignment with the upper section to receive the next container.

The present invention relates to a container handler which is particularly desirable for use in an over-and-under conveyor system of known type, but which container handler possesses multiple motions so as to permit the operator end of the handler to readily adjust in elevation to greatly facilitate loading and unloading of the container to thus minimize the required bending of the operator, and which also thereafter facilitates the movement of the container off of the handler onto the lower conveyor section.

In the improved container handler of the present invention, there is provided an upright frame on which is supported a roll-type conveyor section for supporting a container, which conveyor section at its forward or operator end terminates in an abutment or stop against which the container bears. The operator end of the handler conveyor section is supported on vertical guides, and a first vertical actuator coacts therewith for permitting the operator end to be vertically raised and lowered to any desired elevation to facilitate the operator's access to the container. A second vertical actuator cooperates with the handler conveyor section adjacent the other or rearward end thereof so that the rearward end can be vertically displaced between an upper position wherein it aligns with an upper supply conveyor, and a lower position wherein it aligns with a lower return conveyor.

Other objects and purposes of the invention will be apparent to persons familiar with systems of this general type upon reading the following specification and inspecting the accompanying drawings.

Figure 1:
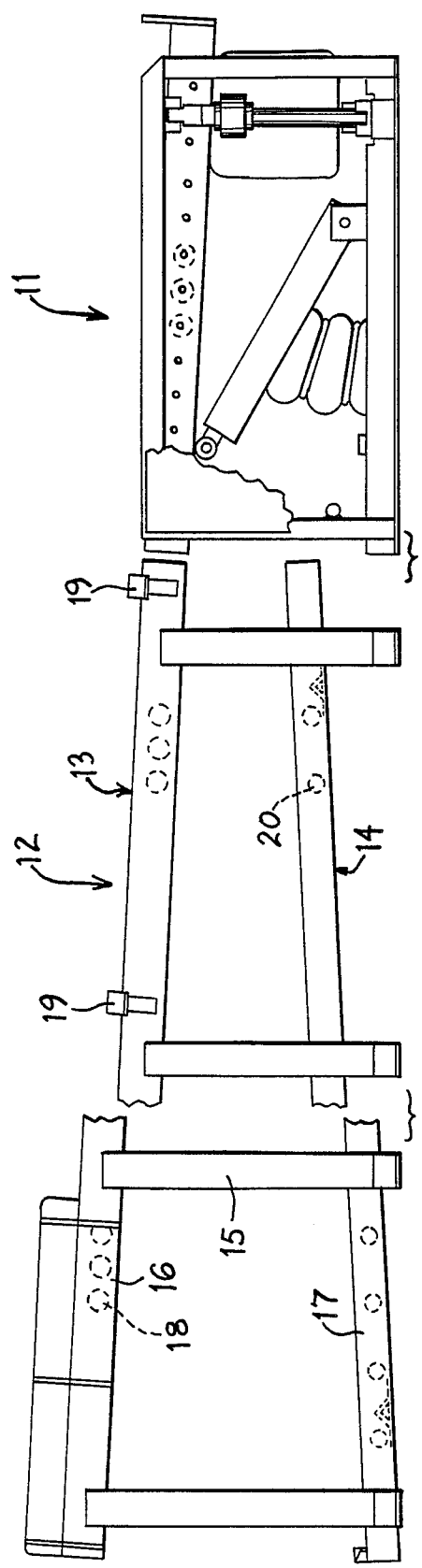
FIG. 1 is a side elevational view illustrating the multi-motion container handler of this invention associated with an over-and-under conveyor system.

Certain terminology will be used in the following description for convenience in reference only, and will not be limiting. For example, the words "upwardly", "downwardly", "rightwardly" and "leftwardly" will refer to directions in the drawings to which reference is made. The word "forwardly" will be used to refer to the normal flow direction of containers, which forward direction in FIG. 1 will be rightwardly along the upper section and leftwardly along the lower section. The words "inwardly" and "outwardly" will refer to directions toward and away from, respectively, the geometric center of the system and designated parts thereof Said terminology will include the words specifically mentioned, derivatives thereof, and words of similar import.

DETAILED DESCRIPTION

Referring to FIG. 1, there is illustrated a multi-motion conveyor handler 11 according to the present invention, which conveyor handler 11 is associated with and hence constitutes part of an otherwise conventional over-and-under conveyor system 12. This over-and-under conveyor system 12 includes an upper conveyor 13 which is typically a conventional gravity-type roller conveyor for supplying containers to the handler 11. Conveyor system 12 also includes a lower conveyor section 1 4 which is also typically of a conventional gravity-type roller conveyor, and this lower conveyor section 14 is disposed directly under and in downwardly spaced relationship from the upper conveyor section 13 so as to permit the containers, after they have been unloaded by the operator, to be moved away from the handler 11.

In the illustrated embodiment as shown by FIG. 1, the conveyor 12 includes a frame formed by generally upright legs 15 having upper and lower side rails 16 and 17, respectively, fixedly secured and extending therebetween. The pairs of parallel upper side rails 16 have conventional conveyor rolls 18 freely rotatably supported therebetween so as to define a gradually downwardly sloped support path for feeding containers toward the handler 11. The upper gravity conveyor section 13 also has conventional retractable stops 19 associated therewith for permitting, when retracted, containers to be sequentially advanced one-by-one in a steplike manner, whereby the operator can hence control the inputting of an individual container onto the handler 11. The lower gravity conveyor section 14 is of similar construction in that it also has a plurality of rollers 20 extending between and being freely rotatably supported by the parallel bottom side rails 17. The rollers 20 define a support surface which gradually slopes downwardly as it projects away from the handler to thus feed the empty containers away from the handler 11.

The structure and operation of the over-and-under conveyor 12, as briefly described above, is conventional both as to its structure and operation so that further description thereof is believed unnecessary. It should be noted, however, that while the upper and lower sections 13 and 14 are both preferably gravity roller conveyors, nevertheless one or both sections could be replaced with powered roller conveyors if desired. For example, the bottom conveyor section 14 could be provided with a powered roller conveyor, and in which case the bottom conveyor section 14 could extend horizontally rather then being downwardly inclined.

Considering now the handler 11, it includes a support frame 21, a container support platform 22 which is vertically movably supported relative to the frame 21, a vertically slidable guide structure 23 which coacts between the frame and the forward end of the support platform 22, a first vertical lifting device 24 which cooperates with the forward end of the support platform 22 to control the vertical position thereof, and a second vertical lifting device 25 which cooperates with the rearward end of the support platform 22 to permit it to be vertically raised between upper and lower positions wherein the rearward end is respectively aligned with the upper and lower conveyor sections 13 and 14.

The frame 21 includes a pair of upright side frames which are disposed in sidewardly spaced and generally parallel relationship. Each side frame includes front and rear uprights 31 and 32 rigidly joined together by top and bottom frame rails 33 and 34 so as to define a generally rigid rectangular frame. Each of these side frames is normally exteriorly covered by a thin platelike skin 35, such as of sheet metal. The two side frames are rigidly joined together by several cross members 36 and 37 which rigidly join the bottom rails 34. The vertical region between the parallel side frames is otherwise open so as to accommodate the vertical movement of the container support platform 22 as described in greater detail hereinafter.

The container support platform 22 is positioned sidewardly between the side frames and includes a pair of generally parallel and elongate L-shaped side rails 41 which are respectively positioned adjacent and just inwardly from the side frames. Each of these L-shaped side rails 41 has a vertically extending leg 42 which, at its lower edge, is fixedly joined to a bottom leg 43 which extends generally perpendicularly inwardly from the vertical leg 42. A plurality of generally parallel and horizontally elongate rollers 44 are disposed upwardly from the bottom legs 43 and extend between the vertical legs 42, the opposite ends of the rollers 44 being suitably supported by the legs 42. The rollers 44 constitute conventional conveyor rolls which are freely rotatably supported on interior hubs which are fixedly secured relative to the side rails 41 in a conventional manner. The plurality of rollers 44 are disposed so that the uppermost points thereof hence define a support plane for a container.

The container support platform 22, at its forward end (rightward end in FIG. 2) has a stop plate 45 which extends transversely between and is fixed to the forward ends of the side rails 41. This stop plate 45 projects upwardly a significant extent above the support plane defined by the rollers 44 to hence function as a stop against which the leading face of the container will abut. When a container is disposed in abutting engagement with the stop flange 45, an operator standing at a work station designated 49 in FIG. 2 can thus access the container positioned on the support platform 22.

The handler 11 of the present invention permits the forward end (rightward end in FIG. 2) of the support platform 22 to be readily vertically raised and lowered to facilitate the operator's access to the container. For this purpose, the guide structure 23 is provided to permit controlled vertical displacement of the forward end of platform 22 relative to frame 21.

The guide structure 23 includes a pair of generally parallel and vertically elongate guide rods 51. Each of the guide rods 51 is associated with one of the side frames and is disposed in close proximity to the front upright 31. The guide rod 51 has its lower end fixedly secured to the bottom rail 34, such as by being bolted to mounting flanges 52 which are welded to the bottom rail. In similar fashion, the upper end of guide rod 51 is fixedly secured, as by bolting, to flanges 53 which are welded to the top frame rail 33. Each guide rod 51 in turn has a slide 54 vertically slidably supported thereon, which slide 54 is in turn pivotally coupled to a hinge bracket 55 which is fixedly secured to and projects downwardly from the leg 43 of the respective side rail 41. An appropriate hinge or pivot pin which defines a horizontal pivot axis 56 joins the hinge bracket 55 and slide 54 together, which hinge axis 56 extends horizontally across the support platform in generally parallel relationship with the rotational axes of the conveyor rolls 44.

The vertical travel extent of the slide 54 is limited by upper stops 57 and lower stops 58 as fixedly associated with the frame.

The operator can readily adjust and select the desired elevation of the forward end of the container support platform 22 by use of the first lifting device 24. This lifting device 24, in the illustrated embodiment, comprises a pneumatically-inflatable air bag 61 which has a lower wall secured to a horizontal support platform 62 which is provided adjacent the bottom of the frame substantially between the front uprights 31. The inflatable air bag 62 has a top wall thereof secured to a support wall 63 which extends between and is fixed to the opposed side rails 41. The air bag 61 can be inflated or deflated by controlling flow of pressure air both to and from the air bag through conventional valves, which valves connect to a suitable air reservoir and compressor. The operator can, through a suitable hand switch, readily control opening and closing of the valves to hence selectively control both inflation or deflation of the air bag 61 to hence position the forward end of the support platform 22 at any desired vertical position between the upper and lower extremes. Such a pneumatic control system for controlling inflation and deflation of the air bag 61 is conventional, and in fact pneumatic air bag raising and lowering devices similar to the bag 61 are also conventional and well known in the material-handling industry.

Considering now the second vertical lifting device 25, it is provided so as to permit the rearward end (leftward end in FIG. 2) of the support platform 22 to be moved between raised and lowered positions for alignment with the upper and lower conveyor sections 13 and 14, respectively. This lifting device 25, in the illustrated embodiment, again includes a pneumatically inflated air bag 71 which is preferably of a vertically segmented construction so as to more readily accommodate angularity between its top and bottom plates when it is vertically expanded. The air bag 71 has its lower wall secured to a bottom support plate 72 which is stationarily disposed and fixedly secured between the bottom frame rails 34. The upper wall of the air bag 71 is secured to a top support plate 73 which in turn is secured to a plurality of sidewardly extending cross rails 74. These cross rails 74 have the opposite ends thereof fixedly secured to a pair of generally parallel and sidewardly spaced lifting levers 75, which levers 75 are disposed adjacent the opposite side frames. The lifting levers 75 have their lower ends pivotally secured by a hinge pin 76 to a support bracket 77 which is secured to the adjacent bottom, frame rail 34, whereby the hinge pins 76 hence define a horizontally extending pivot axis 78 which extends sidewardly of the handler in generally parallel relationship to the pivot axis 56.

The upper free ends of levers 75 mount thereon rollers 79 which are supported for rotation about a horizontal axis generally parallel with the pivot axis 78. The rollers 79 are disposed for direct rolling engagement with generally flat surfaces 46 defined on the underside of the side rail legs 43.

Figure 2:
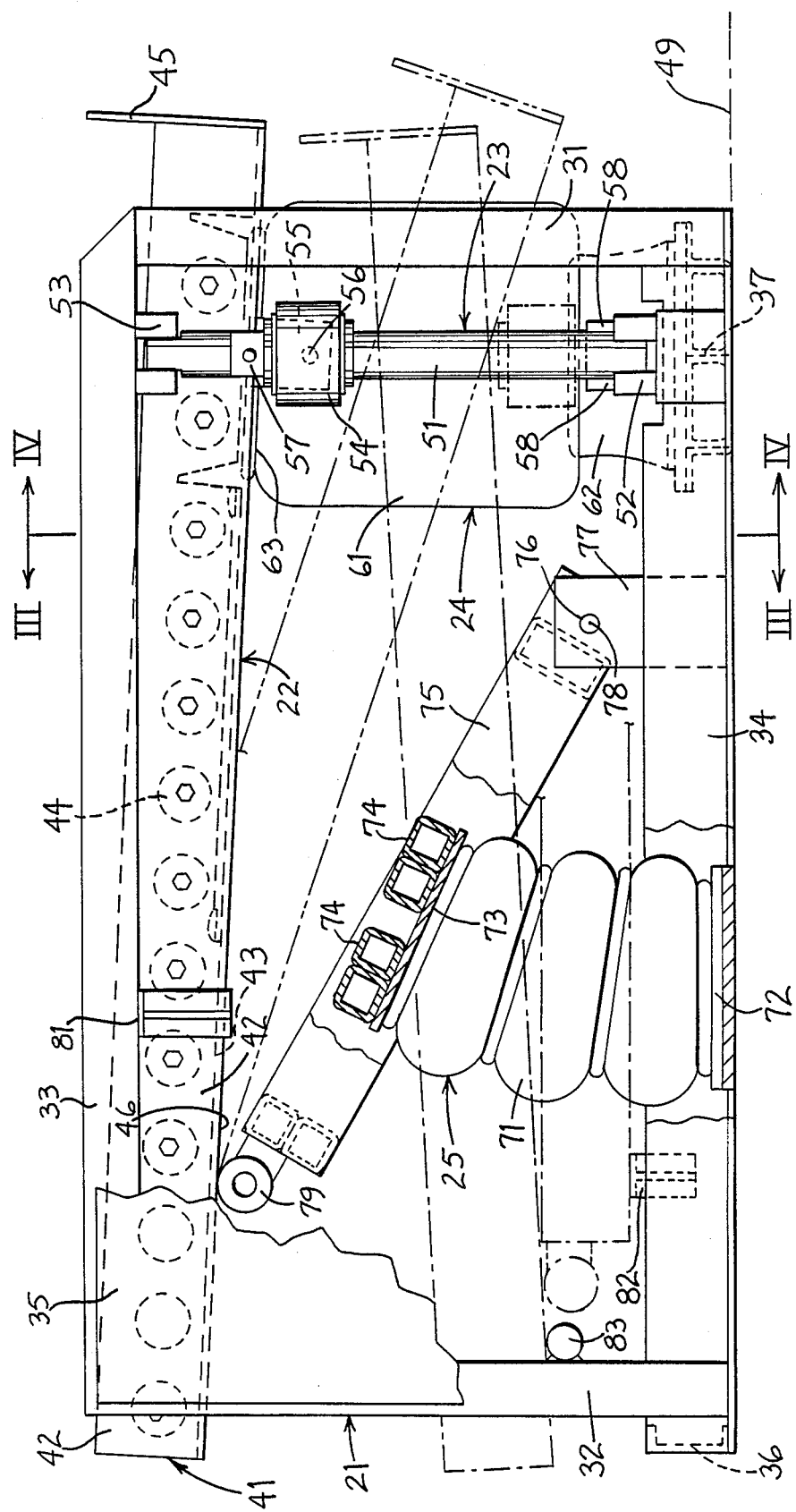
FIG. 2 is a side elevational view, on an enlarged scale, of the container handler shown in its raised position wherein it is aligned with the upper supply conveyor.
Figure 4:
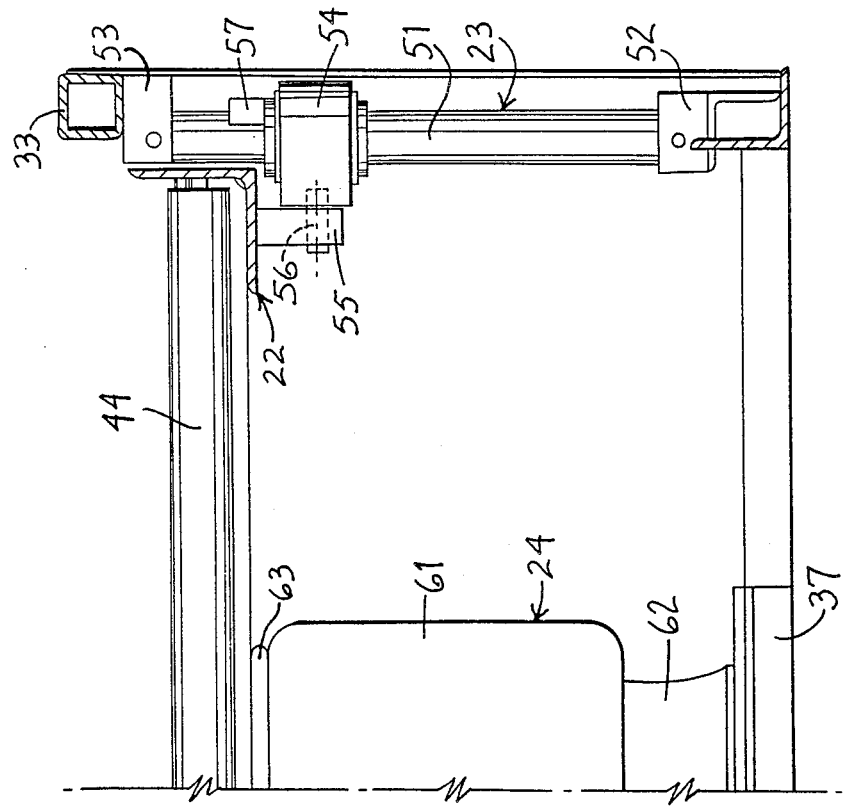
FIG. 4 is a half sectional view taken substantially along line IV—IV in FIG. 2.
Figure 3:
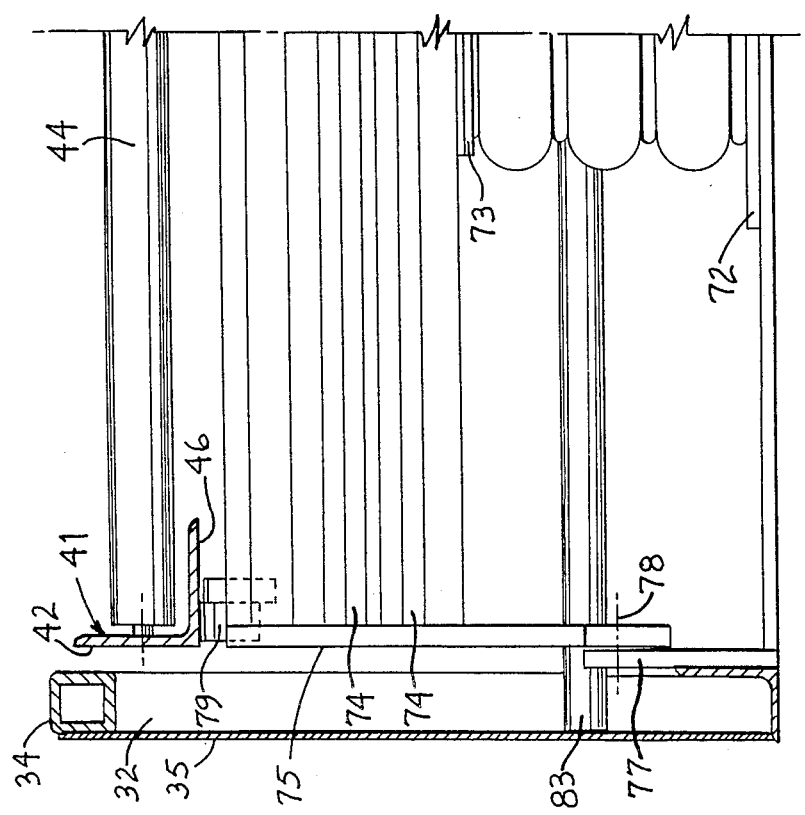
FIG. 3 is a half sectional view taken substantially along line III—III in FIG. 2.

To define an upper limit position, the side rails 41 of the container support platform 22 have stop elements 81 fixedly secured thereto, which stops 81 abut the top frame rails 33 when the support platform 22 is in its uppermost position illustrated by solid lines in FIG. 2, in which position the slides 54 also abut the upper stops 57. A further stop 82 is fixed to each of the bottom frame rails 34 and is adapted to engage the respective lever 75 to provide a lower limit position for the lever 75.

The rear frame uprights 32 also have small rod segments 83 fixedly secured thereto and projecting inwardly therefrom so as to be positioned under the vertical path of travel of the side rails 41. These rod elements 83 also function as stops for engaging the undersurface 46 of the side rails 41 to hence limit the lowermost position of the rearward end of the support platform 22, substantially as illustrated by dotted lines in FIG. 2, to hence align the support platform 22 with the adjacent end of the lower conveyor section 14. The support platform 22, when properly aligned, is disposed in the lowermost dash-dot line position of FIG. 2, in which position the side rails 41 engage the rear stops 83 and the slides 54 engage the front lower stops 58.

The air bag 71 associated with the second lifting device 25 is also controlled in a conventional manner by means of a conventional pneumatic supply system (not illustrated) employing a compressor, an air reservoir, and appropriate valves. The pneumatic supply system, however, is designed so as to permit only two positions, namely the fully extended or raised position illustrated by solid lines in FIG. 2, and the lowered or fully retracted position illustrated by dash-dot lines in FIG. 2.

While the operation of the handler 11 is believed apparent from the description set forth above, nevertheless same will be briefly summarized to ensure a complete understanding thereof.

The handler is normally maintained with the container support platform 22 in its fully raised position as is illustrated by solid lines in FIG. 2, in which position both lifting devices 24 and 25 are fully activated so that the slides 54 abut the upper front stops 57 and the rear stops 81 abut the top frame rails 33. In this position, the rear end of the support platform 22 is thus aligned with the lower discharge end of the upper conveyor section 13. Assuming the support platform 22 is empty and the operator wishes to have a container supplied thereto, then the operator will release the stops 19 in a conventional manner, normally through a suitable pneumatic circuit, thereby permitting the frontmost container to advance from the conveyor 13 by gravity downwardly onto the support platform 22 until it abuts against the front stop 45. The next-most container on the upper conveyor 13 advances forwardly until engaging the frontmost stop 19, at which point it is prevented from advancing onto the support platform 22.

After the container is properly positioned adjacent the stop 45, the operator is then in a position to remove the goods from the container. For this purpose, the operator can at any time adjust the elevation of the front end of the platform 22, and of the container, merely by suitably controlling the amount of inflation or deflation of the air bag 61, thereby permitting the front end of the support platform 22 to be disposed at the most desirable and optimum working elevation. Further, as the level of goods in the container changes during the unloading (or conversely loading) operation, the operator can again suitably vertically adjust the elevation of the forward end of the support platform 22 so as to select a position which is most comfortable to the operator.

After the container has been fully unloaded, then the operator activates the lifting device 24 so as to deflate the air bag 61 and thereby lower the forward end of the support platform 22 into its lowermost position (if it has not already been moved into this position) so that the slides 54 abut the lower front stops 58. After this position has been reached, the operator then activates the lifting device 25 so as to delate the air bag 71 and thereby lower the rear end of the support platform 22 until it abuts the stops 83, in which position the lower support platform is inclined downwardly substantially in alignment with the lower conveyor section 14. The empty container can now be moved by gravity downwardly along the support platform 22 onto the lower conveyor section 14 for discharge at the remote end thereof.

After the empty container has fully moved off of the support platform 22, the operator can then simultaneously activate both of the lifting devices 24 and 25 so that both air bags 61 and 71 are inflated, thereby returning the support platform 22 to its fully raised position. Upon reaching this latter position, the operator can then release the stop 19 associated with the upper conveyor 13 to again release the frontmost container so that it can be supplied onto the support platform 22.

While the handler 11 in the illustrated and preferred embodiment utilizes inflatable air bags associated with each of the lifting devices 24 and 25, it will be appreciated that other conventional devices such as pneumatic cylinders could also be utilized for this purpose.

In situations where the container is anticipated to contain a rather heavy load, then it may be necessary or desirable to provide a releasable locking device for coupling the adjacent ends of the support platform 22 and the upper conveyor section 13 during the time interval that the container is being transferred onto the upper end of the support platform 22. Such arrangement may involve retractable locking pins associated with the rearward ends of each side rail 42, which locking pins can be pneumatically controlled and can be extended rearwardly into suitable openings formed in the lower ends of the side rails 16 of the top conveyor section 13 to hence rigidify the side rails 41 relative to the side rails 16 when the load is transferred onto the platform 22. Of course, after the load has transferred fully onto the platform 22 and abuts the front stop 45, then the locking pins can be automatically retracted so as to not interfere with the subsequent manipulation of the support platform 22.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A container handler for incorporation into an over-and-under conveyor system, said handler comprising:
    frame means including a pair of sidewardly-spaced upright frames;
    a container support platform having means defining thereon a generally upwardly facing support surface for supporting a container, said support platform being positioned generally sidewardly between said side frames and having front and rear ends, said support platform having container stop means provided adjacent the front end thereof and projecting upwardly above the support surface;
    vertically slidable guide means for permitting the front end of said support platform to be vertically moved between upper and lower front end positions;
    first lifting means coupled with said support platform in the vicinity of the front end thereof for vertically raising and lowering the front end of said support platform between said upper and lower positions and for permitting the front end of said support platform to be disposed at any location between said upper and lower positions;
    second lifting means connected with said support platform in the vicinity of the rear end thereof for permitting the rear end to be vertically raised and lowered between upper and lower rear end positions;
    said support platform sloping downwardly at a small angle as it projects from the rear end to the front end when the ends are both in said upper positions, said support platform sloping downwardly at a small angle from the front end to the rear end when the ends are both in said lower positions, said support platform including a pair of generally parallel side rails having a plurality of freely-rotatable conveyor rolls extending there between between in generally parallel relationship to one another, said conveyor rolls having uppermost surfaces which define said support surface, said container stop being fixed to said side rails so as to project upwardly above the upper surface of the conveyor rolls adjacent the front end of the support platform; and
    the slidable guide means including an upright guide rod fixedly associated with each said upright frame adjacent the front end of the support platform, a slide vertically supported on each said guide rod for slidable movement between upper and lower stops which define the respective upper and lower front end positions, and hinge means coupled between each side rail and a respective said slide for defining a generally horizontal hinge axis which extends generally parallel with the axes of said conveyor rolls.

2. A handler according to claim 1, wherein said frame means includes upper and lower stops for limiting and defining the rear end upper and lower positions of the support platform, and the permissible vertical displacement of the rear end of said support platform being greater than the permissible vertical displacement of the front end of said support platform.

3. A handler according to claim 2, wherein said first lifting means includes a pneumatically inflatable bag vertically cooperating between said frame means and said support platform adjacent the front end thereof.

4. A handler according to claim 3, wherein said second lifting means comprises a pair of lifting levers disposed adjacent opposite sides of the handler and having lower ends thereof pivotally coupled to said frame means and upper ends thereof provided with rollers which rollingly engage bottom surfaces of the side rails adjacent the rear ends thereof, and pneumatic lifting means coupled between said frame means and said lifting levers for controlling vertical swinging movement of said levers.

5. A conveyor system for supplying a container to and away from a working station, comprising:
    an upper gravity-type roller conveyor extending at a slight downward incline from an input end to a discharge end, said upper conveyor being adapted to have containers positioned thereon at the input end so that said containers are supplied to the discharge end, said upper conveyor having retractable stop means associated therewith for holding back the leading container;
    a lower gravity-type roller conveyor positioned substantially directly under and spaced downwardly from said upper conveyor, said lower conveyor having an input end for receiving a container with said lower conveyor extending slightly downwardly as it projects away from the input end toward a discharge end, the input end of said lower conveyor being disposed substantially directly vertically under but spaced downwardly a predetermined vertical distance below the discharge end of said upper conveyor so that the container can pass under the discharge end of the upper conveyor so as to be inputted to the input end of said lower conveyor;
    a multi-position container handler means disposed adjacent the discharge and input ends of the respective upper and lower conveyors for receiving thereon a container from the upper conveyor and thereafter discharging the container onto the lower conveyor, said handling means including:
    (a) a frame;
    (b) a container support platform vertically movably supported on the frame and having a rear end positionable adjacent the upper and lower conveyors and a front end disposed adjacent a working station;
    (c) means for selectively pivoting said support platform about first and second pivot points thereon which are respectively located adjacent said front and rear ends of said support platform and which permit said support platform to pivot about either one of said pivot points while said one of said pivot points remains substantially stationary, said last-mentioned means including first and second lifting means coacting between said frame and said support platform for effecting vertical movement of said platform between upper and lower positions, said platform when in said upper position being disposed with the rear end thereof disposed directly aligned and adjacent the discharge end of said upper conveyor so that said platform slopes slightly downwardly as it projects toward said forward end whereby the platform is generally aligned with said upper conveyor, said platform when in said lower position having the rear end disposed adjacent and substantially aligned with the input end of said lower conveyor so that the platform is slightly downwardly inclined as it projects from the front end to the rear end and is substantially aligned with said lower conveyor;

(d) said support platform including a plurality of horizontally elongate support rollers disposed in generally parallel and sidewardly spaced relationship, said support rollers extending sidewardly and being disposed in the region extending from the rear end to the front end so as to define a support surface for the container, said platform having a container stop projecting upwardly above the support rollers adjacent said front end;

(e) said first lifting means being disposed for direct cooperation with said platform adjacent the front end thereof for defining said first pivot point, for permitting vertical displacement of said front end between upper and lower front end positions while said second pivot point remains substantially stationary, and for permitting the front end of said platform to be disposed at any intermediate position between said upper and lower front end positions; and (f) said second lifting means coacting with said platform adjacent the rear end thereof for defining said second pivot point and for permitting raising and lowering of said rear end between upper and lower positions while said first pivot point remains substantially stationary, wherein said rear end is respectively adjacent and aligned with the adjacent end of the upper and lower conveyors.

6. A container handler for incorporation into an over-and-under conveyor system, said handler comprising:

frame means including a pair of stationarily fixed, sidewardly-spaced upright frames;

a container support platform having means defining thereon a generally upwardly facing support surface for supporting a container, said support platform being positioned generally sidewardly between said side frames and having front and rear ends;

container stop means fixedly and nonmovably secured to said support platform adjacent the front end thereof and projecting upwardly above the support surface for preventing movement of containers beyond said front end;

vertically slidable guide means for permitting the front end of said support platform to be vertically moved between upper and lower front end positions;

first lifting means coupled with said support platform in the vicinity of the front end thereof for vertically raising and lowering the front end of said support platform, and said container stop means fixed thereto, between said upper and lower positions, and for permitting the front end of said support platform and said container stop means to be disposed at any location between said upper and lower positions; and second lifting means connected with said support platform in the vicinity of the rear end thereof for permitting the rear end to be vertically raised and lowered between upper and lower rear end positions.

7. A handler according to claim 6 wherein said first and second lifting means are each actuatable independently of one another to effect movement of the respective end of the support platform between the respective upper and lower end positions.

8. A handler according to claim 6, wherein said frame means includes upper and lower stops for limiting and defining the rear end upper and lower positions of the support platform, and the permissible vertical displacement of the rear end of said support platform being greater than the permissible vertical displacement of the front end of said support platform.

9. A handler according to claim 6, wherein said first lifting means includes a pneumatically inflatable bag vertically cooperating between said frame means and said support platform adjacent the front end thereof.

10. A handler according to claim 6, wherein said second lifting means comprises a pair of lifting levers disposed adjacent opposite sides of the handler and having lower ends thereof pivotally coupled to said frame means and upper ends thereof provided with rollers which rollingly engage bottom surfaces of the side rails adjacent the rear ends thereof, and pneumatic lifting means coupled between said frame means and said lifting levers for controlling vertical swinging movement of said levers.

* * * * *